United States Patent [19]

Imanari

[11] Patent Number: 5,680,255
[45] Date of Patent: Oct. 21, 1997

[54] ZOOM LENS BARREL AND ADJUSTMENT METHOD OF THE FLANGE BACK FOCAL DISTANCE OF THE ZOOM LENS BARREL

[75] Inventor: Hitoshi Imanari, Kanagawa, Japan

[73] Assignee: Nikon Corporation, Tokyo, Japan

[21] Appl. No.: 560,308

[22] Filed: Nov. 17, 1995

[30] Foreign Application Priority Data

Feb. 6, 1995 [JP] Japan ................................ 7-018185

[51] Int. Cl.[6] .................................................. G02B 15/14
[52] U.S. Cl. ............................ 359/701; 359/699; 359/700
[58] Field of Search .................................. 359/700, 701, 359/699

[56] References Cited

U.S. PATENT DOCUMENTS 4,387,968  6/1983  Sekiguchi ........................ 359/704
5,144,493  9/1992  Nomura .
5,225,939  7/1993  Iizuka .

*Primary Examiner*—George Y. Epps
*Assistant Examiner*—John P. Cornely
*Attorney, Agent, or Firm*—Oliff & Berridge

[57] ABSTRACT

A zoom lens barrel and a method of adjusting the flange back focal distance of the zoom lens barrel is disclosed. The zoom lens barrel includes mounting members for mounting the zoom lens barrel on a camera body; a zoom ring that rotates for zooming relative to the mounting members; an adjustment member that may rotate with or relative to the zoom ring; and a cam ring. The cam ring is screwed to the adjustment member and moves in the optical axis direction due to the rotation of the adjustment member when the adjustment member rotates relative to the zoom ring, and when the adjustment member and the zoom ring both rotate, the zoom ring and the adjustment member rotate together. Lens units move in the optical axis direction due to the rotation of the cam ring.

18 Claims, 5 Drawing Sheets

ZOOM LENS BARREL AND ADJUSTMENT METHOD OF THE FLANGE BACK FOCAL DISTANCE OF THE ZOOM LENS BARREL

BACKGROUND OF THE INVENTION

1. Field of the invention

This invention relates to an adjustable zoom lens barrel that allows the distance from the flange back plane to the focal plane to be adjusted, as well as to an adjustment method of the flange back focal distance of the zoom lens barrel.

2. Description of Related Art

The following methods are known of adjusting the flange back focal distance of a lens barrel.

A first method inserts an adjustment washer between a mount and a fixed component within the lens barrel.

A second method for lens shutter type cameras displaces the entire optical system, as discussed in U.S. Pat. No. 5,144,493.

A third method adjusts the position of the second lens group for a zoom lens barrel having first and second lens groups as discussed in U.S. Pat. No. 5,225,939.

However, the related art methods of adjusting the flange back focal distance have the following problems.

In the first method, continuous (without steps) adjustment is impossible, and adjustment after assembly is difficult.

In the second method, because the component corresponding to the zoom ring of a single lens reflex interchangeable zoom lens moves in the optical axis direction, operation becomes difficult.

In the third method, a problem of focus movement exists in that the proper spacing of the lens group at the wide angle side and telephoto side cannot be maintained when the first lens group is not positioned properly.

SUMMARY OF THE INVENTION

An objective of the invention is to solve the aforementioned problems and to provide a zoom lens barrel and an adjustment method of the flange back focal distance of a zoom lens barrel that adjusts the flange back focal distance simply and with high precision.

In order to achieve the aforementioned objective, the invention includes a mounting to be fixed to a lens attachment component of a camera body; a zoom ring that can rotate at the fixed component for zooming; an adjustment member that can rotate relative to the zoom ring; a cam ring that is screwed to the adjustment member and moves in the optical axis direction due to the rotation of the adjustment member when the adjustment member rotates relative to the zoom ring, and when the adjustment member and the zoom ring both rotate, the zoom ring and the adjustment member rotate together as one. Lens units move in the optical axis direction due to the rotation of the cam ring.

The invention is also directed to an adjustment method of adjusting the flange back focal distance of a zoom lens barrel that includes a mounting to be fixed to a lens attachment component of a camera body; a zoom ring that can rotate at the fixed member, for zooming; an adjustment member that can rotate relative to the zoom ring; a cam ring that is screwed together to the adjustment member and that moves in the optical axis direction due to the rotation of the adjustment member when the adjustment member rotates relative to the zoom ring, and when the adjustment member and the zoom ring both rotate, the zoom ring and the adjustment member rotate together as one; and lens units that move in the optical axis direction due to the rotation of the cam ring. The method includes rotating the adjustment member around the optical axis relative to the zoom ring to move the cam ring in the optical axis direction, to adjust the flange back focal distance of the zoom lens barrel, and the zoom ring and the adjustment member are fixedly connected in order that the zoom ring and the adjustment member rotate as one after adjustment of the flange back focal distance.

According to the invention, the zoom ring and the adjustment member are fixedly connected except at the time of adjusting the flange back focal distance. With zooming, when rotating the zoom ring, the adjustment member as well as the cam ring rotate around the optical axis together with the zoom ring, lens units are moved in the direction of the optical axis to achieve zooming. At the time of flange back focal distance adjustment, the zoom ring and the adjustment member are not fixedly connected, but instead, the adjustment member rotates around the optical axis relative to the zoom ring (without rotating the zoom ring). That causes the lens units to move in the optical axis direction, adjusting the flange back focal distance. After the adjustment of the flange back focal distance, the zoom ring and the cam ring are fixedly connected.

Thus simple, highly precise adjustment of the flange back focal distance of a zoom lens barrel is possible.

BRIEF DESCRIPTION OF THE DRAWINGS

An embodiment of the invention is described hereafter with reference to the drawings, wherein.

DETAILED DESCRIPTION OF PREFERRED EMBODIMENTS

Figure 1:
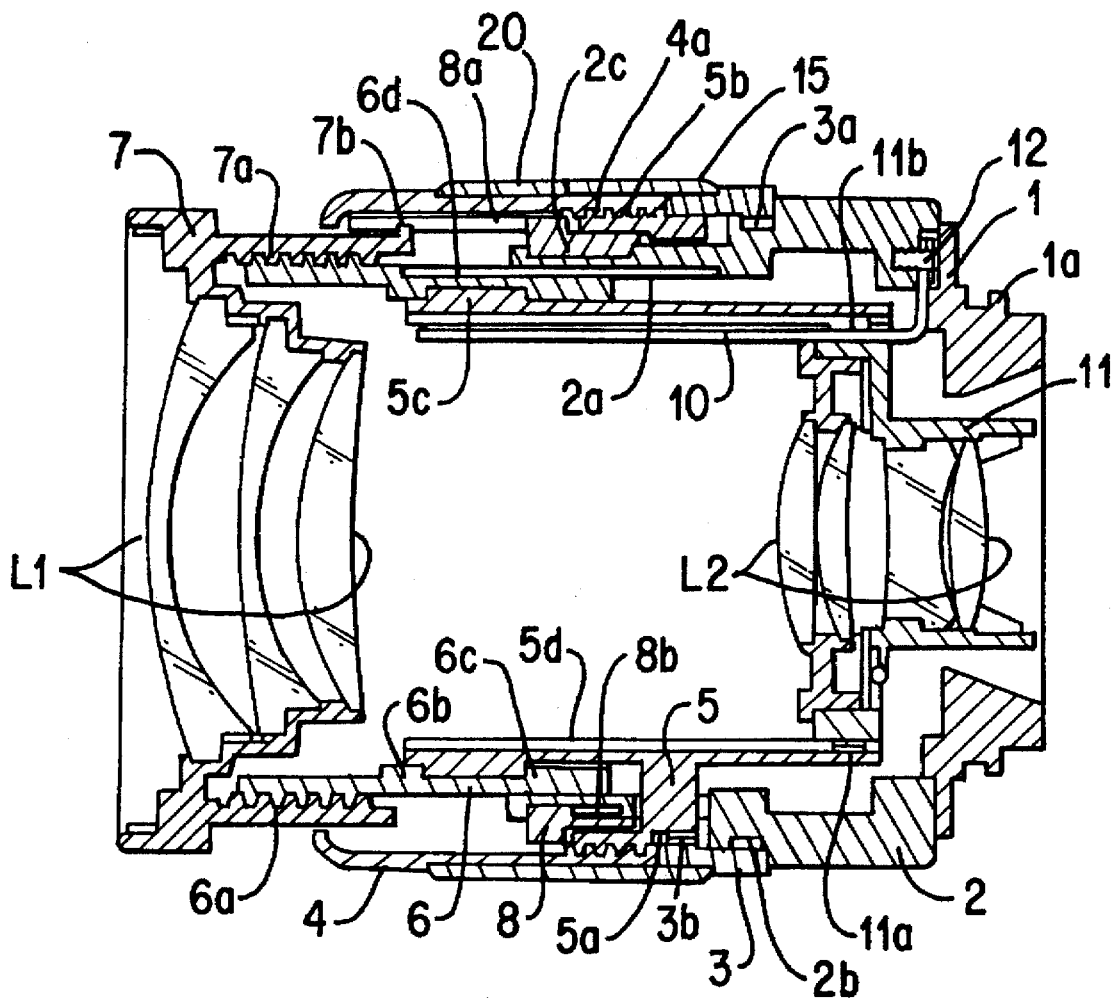
FIG. 1 is a cross-sectional view of an embodiment of a zoom lens barrel according to the invention.

In FIG. 1, a mount 1 is to be attached to a mount (not shown in the figures) on the side of a camera body. Mount 1 is provided with bayonet components 1a.

A member 2 is fixed to mount 1, to form a mounting member. Member 2 includes linear keys 2a, a circumferential channel 2b and a circumferential channel 2c. Linear keys 2a are arranged in three places protruding from the inner diameter side of the member 2. The circumferential channel 2b is arranged so as to cover the limits of the zooming around the optical axis. The circumferential channel 2c is arranged at the forward portion of the member 2.

A zoom ring 3 performs the zooming action by rotating around the optical axis, and includes pins 3a and a linear key 3b. The pins 3a are arranged in three places protruding from the inner diameter side of the zoom ring 3 and mesh with the circumferential channel 2b. Linear key 3b protrudes from the front edge portion of the inner diameter side of the zoom ring 3.

An adjustment member 4 may rotate around the optical axis, and has a female helicoid screw 4a on its inner side.

Figure 2:
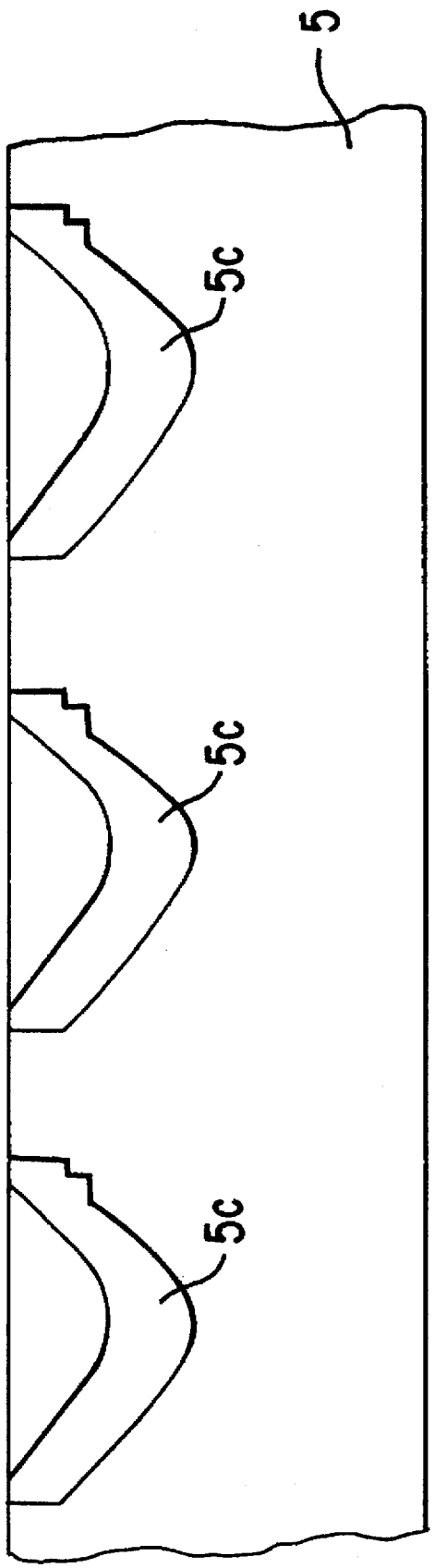
FIG. 2 is a linearly presented view of the cam ring and cam protuberances of the embodiment of FIG. 1.
Figure 3:
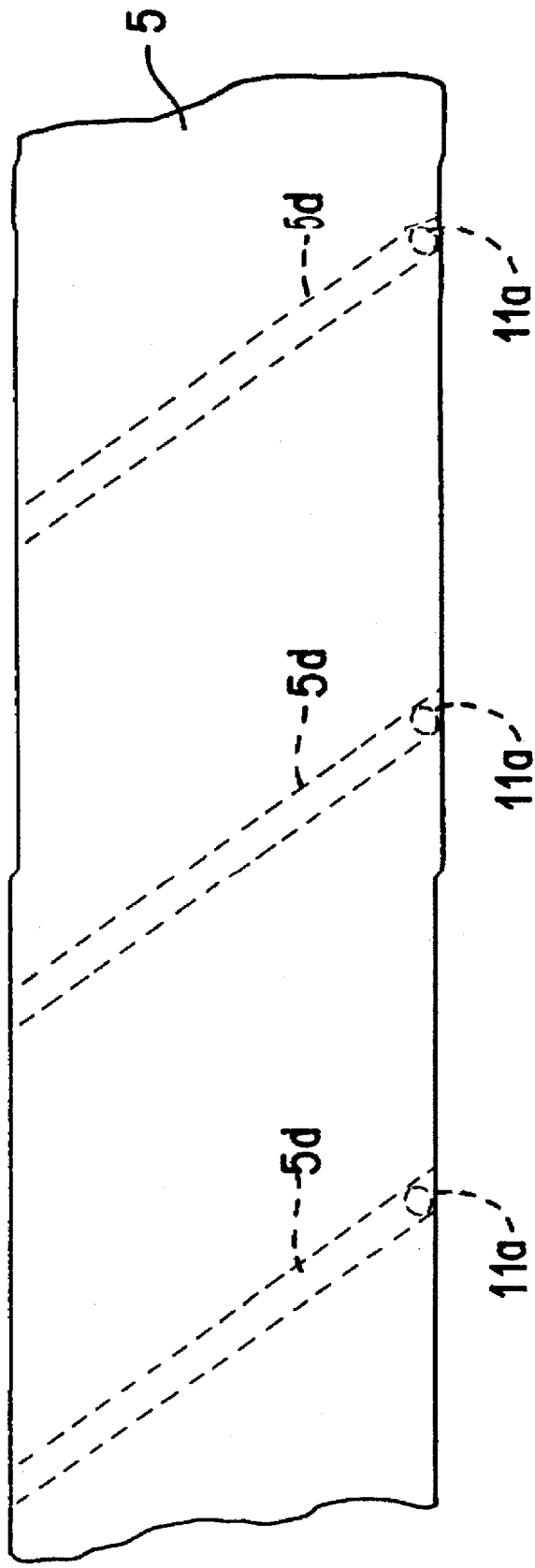
FIG. 3 is a linearly presented view of the cam ring and cam channels of the embodiment of FIG. 1.
Figure 5:
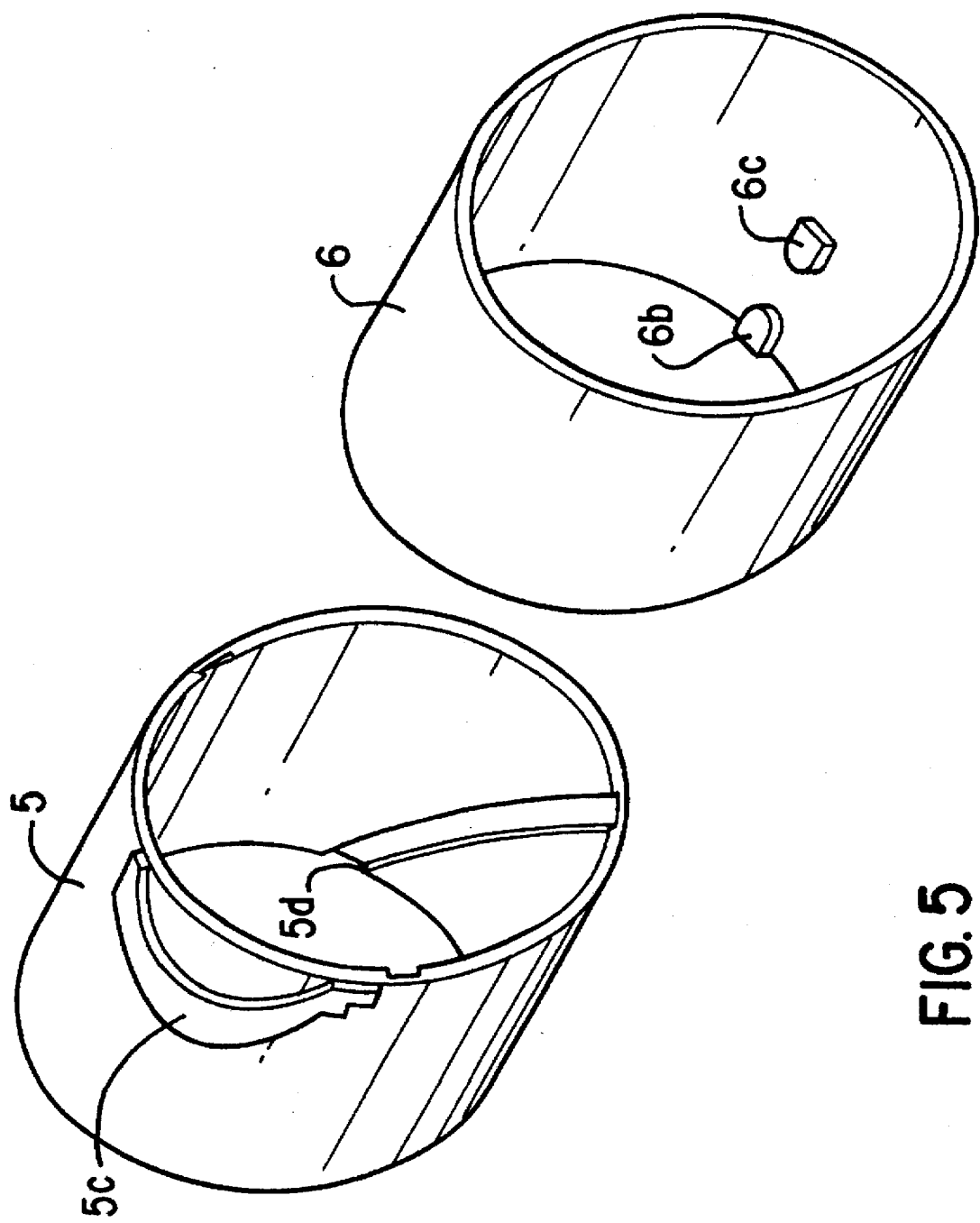
FIG. 5 is an oblique exploded view of the cam ring and male helicoid member of the embodiment of FIG. 1.

A cam ring 5 controls the movement of a first lens unit L1 and a second lens unit L2, and includes a linear channel 5a, a male helicoid screw 5b, cam protuberances 5c, and cam channels 5d. The linear channel 5a is arranged on the exterior of the cam ring 5 and meshes with the linear key 3b. The male helicoid screw 5b is arranged on the exterior of the cam ring 5 and is helicoid connected to the female helicoid screw 4a. The cam protuberances 5c are arranged on an exterior surface of the cam ring 5, as shown in FIGS. 2 and 5. The cam channels 5d are formed on an inner surface of the cam ring 5, as shown in FIGS. 3 and 5.

Figure 4:
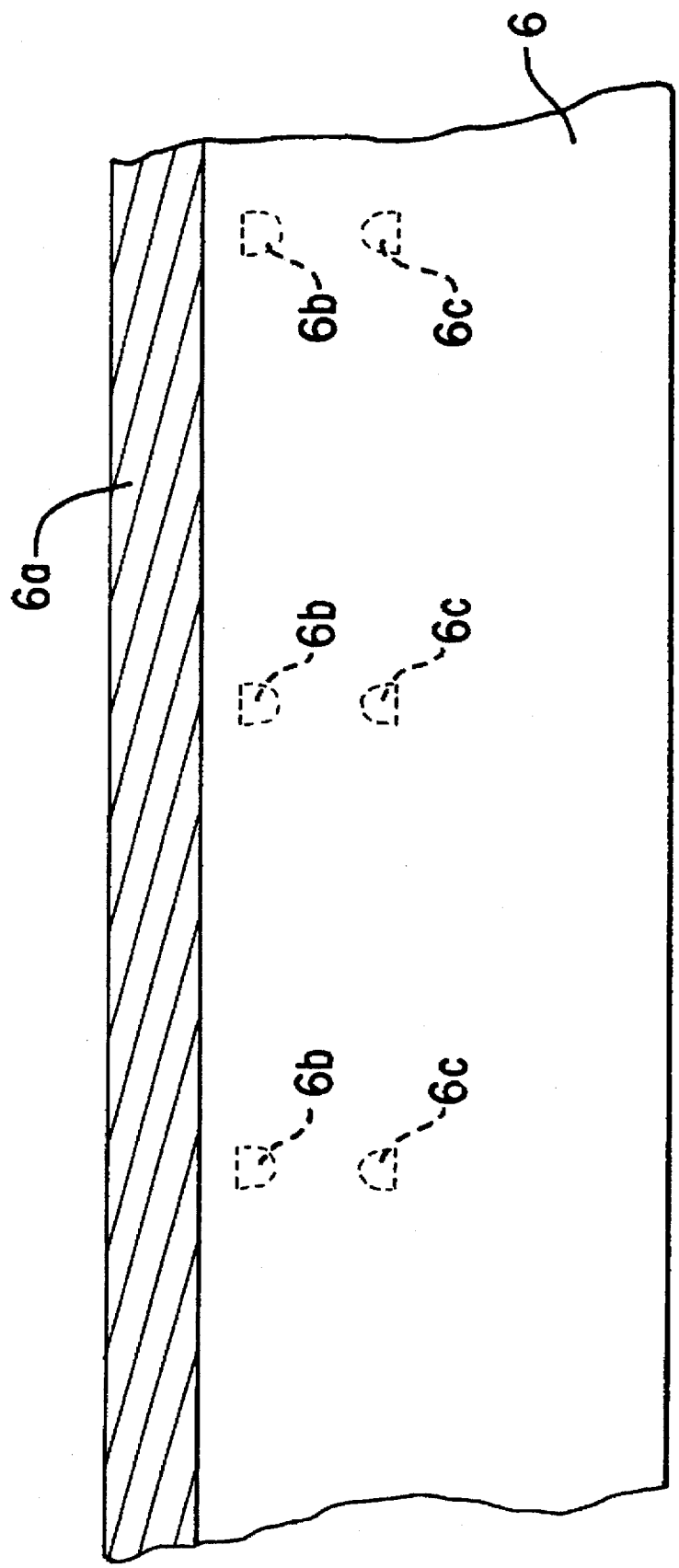
FIG. 4 is a linearly presented view of the male helicoid member and cam followers of the embodiment of FIG. 1.

A male helicoid member 6 (FIGS. 1, 4 and 5), an intermediate member, is arranged to move in the direction of the optical axis, and include a male helicoid screw 6a (not shown in FIG. 5 to simplify the figure), cam followers 6b and 6c, and a linear channel 6d (FIG. 1). The male helicoid screw 6a is arranged at the external front edge portion. The cam followers 6b and 6c are arranged on the inner diameter side of the male helicoid component 6, and each cam protuberance 5c meshes so as to fit between a pair of cam followers 6b and 6c. The linear channel 6d is arranged on the external side of the male helicoid member 6 and meshes with the linear key 2a.

A holding frame 7 holds the first lens unit L1, and includes a female helicoid screw 7a and a key 7b. The female helicoid screw 7a is arranged on the inner diameter side of the holding frame 7 and helicoid meshes with the male helicoid screw 6a. Key 7b is arranged protruding into the external rear edge portion.

A drive ring 8 rotates around the optical axis due to the drive force from the drive component (not shown in the figures), and is arranged only to rotate around the optical axis by way of the circumferential channel 2c. The drive ring 8 has a key 8a and a drive gear 8b. The key 8a extends in the optical axis direction on the first lens unit L1 side to mesh with key 7b. The drive gear 8b is arranged on the inner side of the drive ring 8, and meshes with the drive gear (not shown in the figures) of the drive component.

A linear guide member 10 extends in the direction of the optical axis and is fixed in position by a screw 12 to the member 2.

A holding member 11 holds the second lens unit L2, and has link protuberances 11a and a channel 11b. The link protuberances 11a are arranged on the external side of the holding component 11a and mesh with the cam channel 5d. The channel 11b is arranged on the external side of the holding component 11 and meshes with the linear guide member 10.

Adhesive tape 15 is used as a connecting device that fixes together the zoom ring 3 to the adjustment member 4.

After being fixed together by the adhesive tape 15, a rubber ring 20 covers the exterior of the zoom ring 3 and the adjustment member 4.

Next, the action of this zoom lens barrel will be explained.

First, for the case of performing the zooming action, the zoom ring 3 is rotated around the optical axis. In this instance, the adjustment member 4 is held to rotate together with the zoom ring 3 by the adhesive tape 15, and also the linear channel 5a meshes with the linear key 3b. Accordingly, the adjustment member 4 and the cam ring 5 rotate as one with the zoom ring 3 around the optical axis. Additionally, the cam protuberances 5c and the cam followers 6b and 6c mesh, and the linear key 2a and the linear channel 6d mesh. Accordingly, when rotating the cam ring 5 around the optical axis, the male helicoid member 6 moves in the direction of the optical axis. By this means, the holding frame 7 and the first lens unit L1 accomplish zooming movement in the optical axis direction as one with the male helicoid member 6. Additionally, when rotating the cam ring 5, due to the meshing of the cam channels 5d with the link protuberances 11a, as well as the meshing of the linear guide member 10 and the channel 11b, the second lens unit L2 performs zooming movement in the direction of the optical axis.

In addition, for the case of manually performing the focus operation, the holding frame 7 is rotated around the optical axis. Here, the holding frame 7 helicoid meshes with the male helicoid member 6. Accordingly, the holding frame 7, by being rotated around the optical axis, is moved in the optical axis direction and the focus action is performed. When the holding frame 7 rotates, key 7b and key 8a abut together, and the drive ring 8 rotates with the holding frame 7. Meanwhile, for the case of AF (auto focus), the drive ring 8 rotates around the optical axis by the drive force from the drive component, and the holding frame 7 and the first lens unit L1 move in the optical axis direction while rotating around the optical axis.

Next, the adjustment of the flange back focal distance will be explained.

In the zoom lens barrel, an error occurs in the focus position of the optical system due to the construction tolerances and differences in assembly of the components. Accordingly, the first lens unit L1 is moved in the optical axis direction, and adjusted so that focal plane movement due to zooming does not occur. Initial adjustment can be performed, for example, by using a washer or by shifting the rotation limit position. Because the flange back focal distance of the entire optical system will be shifted by adjusting the focus position, the adjustment of the flange back focal distance is accomplished after making the aforementioned adjustment.

The adjustment of the flange back focal distance is made before the adhesive tape 15 is used. Before the adhesive tape 15 is used, the adjustment member 4 is rotated around the optical axis. The female helicoid screw 4a meshes with the male helicoid screw 5b, and the linear channel 5a meshes with the linear key 3b. Accordingly, the cam ring 5 moves in the optical axis direction without rotating around the optical axis. The first lens unit L1 and the second lens unit L2 are moved in the optical axis direction due to movement of the cam ring 5. The relative position around the optical axis of the cam ring 5 and the zoom ring 3 does not change. Thus, the flange back focal distance is adjusted. After this adjustment, the zoom ring 3 and the adjustment member 4 are fixed together by the adhesive tape 15, and the rubber ring 20 is attached.

Through the aforementioned method, the flange back focal distance can be adjusted simply and also with high precision.

According to the invention, the flange back focal distance can be adjusted simply and also with high precision even after the assembly of the zoom lens barrel and large focal plane movement does not occur through zooming after the flange back focal distance adjustment is performed.

While the invention has been described in conjunction with a specific embodiment thereof, it is evident that many alternatives, modifications and variations will be apparent to those skilled in the art. Accordingly, the embodiment of the invention as set forth herein is intended to be illustrative, not limiting. Various changes may be made without departing from the spirit and scope of the invention as defined in the following claims.

What is claimed is:

1. A zoom lens barrel including a mounting member for mounting the zoom lens barrel on a camera body, the zoom lens barrel comprising:

a zoom ring rotatable on the mounting member about an optical axis to perform zooming;

an adjustment member connected to the zoom ring to rotate with or relative to the zoom ring about the optical axis;

a cam ring connected to the zoom ring and the adjustment member to rotate about the optical axis with rotation of the zoom ring and the adjustment member together about the optical axis and to move without rotation in the direction of the optical axis with rotation of the adjustment member without rotation of the zoom ring about the optical axis;

a plurality of lens units that move in the direction of the optical axis with translation along the optical axis of the cam ring or rotation about the optical axis of the cam ring; and a connecting device that connects the zoom ring and the adjustment member for rotation together for zooming control.

2. The zoom lens barrel of claim 1, wherein the cam ring and the adjustment member are connected by a screw connection about the optical axis, the screw connection providing the movement without rotation of the cam ring in the direction of the optical axis with rotation of the adjustment member relative to the cam ring about the optical axis.

3. The zoom lens barrel of claim 1, wherein the connecting device includes an adhesive material.

4. The zoom lens barrel of claim 1, wherein the zoom ring includes either a linear channel or a linear key and the cam ring includes a remaining one of said linear channel and said linear key for engagement of the linear key and the linear channel to prevent relative rotation of the zoom ring and cam ring about the optical axis.

5. The zoom lens barrel of claim 1, wherein each of the plurality of lens units is held in a holding frame, and each of the holding frames is moveable along the optical axis without rotation by a first cam structure engaged with a second cam structure on the cam ring to perform zooming by rotation of the cam ring.

6. The zoom lens barrel of claim 5, further comprising an intermediate member including one of the first cam structures and connected by a screw connection about the optical axis to one of the holding frames, the screw connection providing the movement along the optical axis with rotation of the one of the holding frames relative to the intermediate member to adjust the focus of the zoom lens barrel.

7. A zoom lens barrel including mounting means for mounting the zoom lens barrel on a camera body, the zoom lens barrel comprising:

zoom ring means rotatable on the mounting means and about an optical axis for performing zooming;

adjustment means connected to the zoom ring means for rotation with or relative to the zoom ring means about the optical axis;

cam ring means connected to the zoom ring means and the adjustment means for rotating about the optical axis with rotation of the zoom ring means and the adjustment means together about the optical axis and for moving without rotation in the direction of the optical axis with rotation of the adjustment means without rotation of the zoom ring means about the optical axis;

a plurality of lens units that move in the direction of the optical axis with translation or rotation of the cam ring means; and connecting means for connecting the zoom ring means and the adjustment means for rotation together for zooming control.

8. The zoom lens barrel of claim 7, wherein the cam ring means and the adjustment means are connected by screw means about the optical axis, the screw means providing the movement without rotation of the cam ring means in the direction of the optical axis with rotation of the adjustment means relative to the cam ring means about the optical axis.

9. The zoom barrel of claim 7, wherein the connecting means includes adhesive means.

10. The zoom lens barrel of claim 8, wherein the zoom ring means include either male connecting means or female connecting means and the cam ring means include a remaining one of said male connecting means and said female connecting means for engagement of the male and the female connecting means for preventing relative rotation of the zoom ring means and the cam ring means about the optical axis.

11. The zoom lens barrel of claim 7, wherein each of the plurality of lens units is held in a holding means, and each of the holding means is moveable along the optical axis without rotation by first cam means engaged with second cam means on the cam ring means to perform zooming by rotation of the cam ring means.

12. The zoom lens barrel of claim 11, further comprising an intermediate means including one of the first cam means and connected by a screw means about the optical axis to one of the holding means, the screw means providing the movement along the optical axis with rotation of the one of the holding means relative to the intermediate means to adjust the focus of the zoom lens barrel.

13. A method of adjusting a zoom lens barrel including a mounting member for mounting the zoom lens barrel on a camera body, wherein the zoom lens barrel includes a zoom ring rotatable on the mounting member about an optical axis to perform zooming; an adjustment member connected to the zoom ring to rotate with or relative to the zoom ring about the optical axis; a cam ring connected to the zoom ring and the adjustment member to rotate about the optical axis with rotation of the zoom ring and the adjustment member together about the optical axis and to move without rotation in the direction of the optical axis with rotation of the adjustment member without rotation of the zoom ring about the optical axis; and a plurality of lens units that move in the direction of the optical axis with translation or rotation of the cam ring, comprising the steps of:

rotating the adjustment member about the optical axis without rotation of the cam ring or the zoom ring to cause translation of the cam ring and the plurality of lens units; and connecting the adjustment member and the zoom ring for rotation together about the optical axis.

14. The method of claim 13, further comprising the step of screwing the cam ring and the adjustment member together about the optical axis for providing the movement without rotation of the cam ring in the direction of the optical axis with rotation of the adjustment member relative to the cam ring about the optical axis.

15. The method of claim 13, wherein said connecting step includes connecting the adjustment member and the zoom ring with an adhesive material.

16. The method of claim 13, wherein the zoom ring includes one of a linear channel and a linear key and the cam ring includes the other of a linear channel and a linear key, further comprising the step of engaging the linear key and the linear channel to prevent relative rotation of the zoom ring and cam ring about the optical axis.

17. The method of claim 13, wherein each of the plurality of lens units is held in a holding frame, and each of the holding frames is moveable along the optical axis without rotation by a first cam structure engaged with a second cam structure on the cam ring, further comprising the steps of:
  preventing the holding frames from rotating about the optical axis; and
  rotating the cam ring to translate the holding frames to perform zooming.

18. The method of claim 17, wherein the zoom lens barrel further comprises an intermediate member including one of the first cam structures and connected by a screw connection about the optical axis to one of the holding members, further comprising the step of rotating the one of the holding members relative to the intermediate member to adjust the focus the zoom lens barrel.

* * * * *